Patented Aug. 12, 1952

2,606,813

UNITED STATES PATENT OFFICE 2,606,813

PROCESS OF PRODUCING AQUEOUS SOLUTIONS OF AMMONIUM NITRITE

Kurt Kahr, Ems, Switzerland, assignor to Inventa A.-G. für Forschung und Patentverwertung Luzern, Lucerne, Switzerland No Drawing. Application August 11, 1950, Serial No. 178,980. In Switzerland August 27, 1949

2 Claims. (Cl. 23—104)

This invention relates to an improved method for the production of aqueous solutions of ammonium nitrite.

As known to those skilled in the art, ammonium nitrate is obtained, besides ammonium nitrite, when nitrous gases not absorbed by water are subsequently absorbed in diluted aqueous solutions of ammonium bicarbonate.

As in this manner predominantly ammonium nitrate is formed, the process is not suitable for the production of ammonium nitrite.

According to past experience with the absorption of nitrous gases in aqueous solutions, the formation of nitrite with satisfactory yield only takes place in strongly alkaline solutions. Thus, in dilute caustic soda solution and milk of lime there are formed abt. 90–94% of sodium nitrite or calcium nitrite, respectively, and 6–10% of the corresponding nitrate. In neutral or slightly alkaline solutions, the formation of nitrite decreases considerably while the nitrate quantity increases.

Ammonium nitrite is used in the art predominantly as starting material for the production of hydroxylaminsulfate in the Raschig synthesis.

It was hitherto technically produced from calcium nitrite by decomposing it in solution with an equimolecular amount of ammonium sulfate solution. The large amount of the precipitated calcium sulfate, however, always absorbed a part of the ammonium nitrite which was formed, so that the conversion amounted to only 90–95%. The ammonium nitrite solutions thus obtained still contained up to 20% of ammonium nitrate, referred to solid nitrite. This method of producing ammonium nitrite is very tedious because of the separation of calcium sulfate.

It has been found that aqueous ammonium nitrite solutions can be obtained in a simple manner if nitrous gases of almost equimolecular composition of nitric oxide and nitrogen dioxide are absorbed in concentrated aqueous ammonium bicarbonate or ammonium carbonate solutions or mixtures thereof, thereby maintaining the concentration of the latter. In this manner, solutions may be obtained which contain, in addition to ammonium-bicarbonate-carbonate abt. 84% of ammonium nitrite and 16% of ammonium nitrate. By boiling down such solutions under 30° C., there can be obtained concentrated ammonium nitrite solutions free of bicarbonates or carbonates.

The nitrous gases are advantageously obtained by burning gaseous ammonia with air over platinum-rhodium gauze as a catalyzer. The most favorable composition of the nitrous gases for the formation of nitrites is obtained by burning 11 volumetric percent of ammonia in the mixture at the usual temperature of abt. 700° C.

When using ammonium bicarbonate solution for the absorption of the nitrous gases, the concentration may easily be kept constant by carrying out the absorption with solid bicarbonate as base substance. Hereby, the fog, arising otherwise on absorption in ammonia containing solutions, is only slight. If absorption takes place only in concentrated ammonium bicarbonate solutions, the concentration is reduced by consumption of the bicarbonate and release of carbon dioxide, and a diluted solution remains. In this case, the amount of ammonium nitrite formed decreases, and the amount of ammonium nitrate rapidly increases. In order to achieve uniformly good nitrite yields, the amount of ammonium bicarbonate in the absorbing solution is constantly to be replenished by adding fresh ammonium bicarbonate or carbonate. The best yields of ammonium nitrite are achieved with saturated ammonium bicarbonate solutions, whereby it makes no difference whether this saturation is present in pure water or in the ammonium nitrite solution. The saturation of the water with ammonium bicarbonate amounts, at 0° C., to 10–11% by weight, the saturation of the nitrite solution hereby occurs at lower concentration.

Instead of the ammonium bicarbonate, ammonium carbonate or a mixture of ammonium bicarbonate and carbonate can be used with equal success, which has the advantage that less carbon dioxide is lost in absorption. Hereby, the concentration of these solutions during absorption should be at least that which corresponds to that of the saturated bicarbonate solution with respect to the carbon dioxide content. As the most advantageous ammonium bicarbonate-carbonate mixture in the absorption solution, one with 10–50% bicarbonate and 50–90% carbonate, respectively, is used. Such solutions have a pH value of 8.3–8.9.

The absorption of the nitrous gases in concentrated ammonium bicarbonate-carbonate solutions can be easily made continuous if the carbon dioxide level is maintained sufficiently high in the ammonium bicarbonate-carbonate of the absorption solution. The solution added for continuous absorption accordingly is of such a concentration of ammonia and carbon dioxide, that, for one thing, the ammonia suffices for the neutralization of the nitrous gases and replacement of the ammonium bicarbonate-carbonate contained in the absorption solution, and furthermore, the carbon dioxide suffices to maintain the carbon dioxide level constant in the absorption solution. The solution added for continuous absorption of the nitrous gases thus always contains ammonium carbonate with a certain amount of free ammonia. Normally, the ammonia losses are only slight on absorption, whereas the loss of carbon dioxide is somewhat greater. The carbon dioxide and ammonia quantities drawn off with the inert gases of the nitrous gases on absorption can be reabsorbed for recovery.

The temperature on absorption of the nitrous gases in ammonium bicarbonate-carbonate solution should be around the freezing point at about 0° C. or below, in order to achieve high nitrite yields and avoid greater losses of carbon dioxide and ammonia. At +10° C. losses of ammonium nitrite hardly occur and at +20° C. they are already appreciable.

The ammonium nitrite yields achieved by absorption of nitrous gases in concentrated ammonium bicarbonate-carbonate solutions amount to abt. 76% of the theoretical amount referred to the ammonia used for burning.

The ammonium nitrite solutions containing ammonium bicarbonate-carbonate can be used without difficulty for the production of hydroxylamin sulfate.

Example 1

72 volumetric parts of ammonia gas are burned in 4 hours with 585 vol. parts of air over platinum-rhodium gauze at abt. 700° C. and the nitrous gases are introduced, by means of a nozzle, into a stirring vessel that is charged with a mixture of 250 parts by weight of ammonium bicarbonate and 750 parts by volume of water. Under good stirring and cooling the mixture is kept at 0° C. After completion of absorption there result 1000 parts by volume of an ammonium nitrite solution which contains 136 g./l. ammonium nitrite, 33 g./l. ammonium nitrate, and 62 g./l. ammonium bicarbonate. The ammonium nitrite yield amounts to 75.9% of the theoretical, referred to the ammonia used and burned.

Example 2

The nitrous gases obtained as per Example 1 are absorbed within 4 hours at 0° C. under constant stirring in 800 vol. parts of a solution containing 7 parts by weight of ammonium bicarbonate and 76.7 parts by weight of ammonium carbonate. Simultaneously, during this time, 500 vol. parts are gradually introduced of a special solution containing 10.4 weight parts of ammonium bicarbonate and 113.4 weight parts of ammonium carbonate. After the absorption an ammonium nitrite solution containing ammonium bicarbonate-carbonate, 100 g./l. is obtained, corresponding to a 74.7% yield.

Example 3

The nitrous gases obtained as per Example 1 are absorbed in 4 hours at 0° C. under constant stirring in a stirring vessel with overflow at 750 vol. parts, which is filled with 750 vol. parts of a solution of 130 g./l. ammonium nitrite, 32 g./l. ammonium nitrate, 6.1 g./l. ammonium bicarbonate and 70 g./l. ammonium carbonate. Into this solution, in the same time, 1000 vol. parts of a solution with 179 g./l. ammonium carbonate and 5.5 g./l. ammonia are gradually added. Every hour 250 vol. parts of a solution overflow from the stirring vessel, said solution containing 131 g./l. ammonium nitrite, 32 g./l. ammonium nitrate, 33.6 g./l. ammonium bicarbonate, and 56.5 g./l. ammonium carbonate. The amount of ammonium nitrite obtained corresponds to a yield of 75.8%.

I claim:

1. The process of producing aqueous solutions of ammonium nitrite by absorbing nitrous gases of almost equimolecular composition of nitric oxide and nitrogen dioxide in a solution containing a mixture of ammonium bicarbonate and ammonium carbonate, wherein said absorbing solution is at all times during the absorption process maintained saturated with the said mixture of ammonium bicarbonate and ammonium carbonate salts and wherein the absorption of said nitrous gases is performed at a temperature near the freezing point of the absorbing solution.

2. The process set forth in claim 1, wherein the absorption of nitrous gases in the said saturated solution of a mixture of ammonium bicarbonate and ammonium carbonate is carried out continuously.

KURT KAHR.

REFERENCES CITED

The following references are of record in the file of this patent:

UNITED STATES PATENTS

| Number | Name | Date |
| --- | --- | --- |
| 1,903,815 | Handforth | Apr. 18, 1933 |
| 2,032,699 | Hayes et al. | Mar. 3, 1936 |

OTHER REFERENCES

Mellor, "Treatise on Inorganic and Theoretical Chemistry" (1928), vol. VIII, page 470.